(12) United States Patent
Rowse et al.

(10) Patent No.: US 6,948,301 B2
(45) Date of Patent: Sep. 27, 2005

(54) METHOD AND APPARATUS FOR RAISING OR LOWERING THE RAKING WHEELS OF A FOLDABLE HAY RAKE

(75) Inventors: Dan D. Rowse, Ord, NE (US); Rodney D. Rowse, O'Neill, NE (US)

(73) Assignee: Rowse Hydraulic Rakes, Co, Inc., O'Neill, NE (US)

( * ) Notice: Subject to any disclaimer, the term of this patent is extended or adjusted under 35 U.S.C. 154(b) by 0 days.

(21) Appl. No.: 10/742,078

(22) Filed: Dec. 19, 2003

(65) Prior Publication Data

US 2005/0034442 A1 Feb. 17, 2005

Related U.S. Application Data

(63) Continuation-in-part of application No. 10/640,959, filed on Aug. 14, 2003.

(51) Int. Cl.⁷ ............................................. A01D 78/10
(52) U.S. Cl. ....................................................... 56/377
(58) Field of Search ........................ 56/377, 367, 370, 56/375, 344, 345, 350, 354, 365, 366, 376, 378, 379, 380

(56) References Cited

U.S. PATENT DOCUMENTS

| 4,214,428 A | * | 7/1980 | Caraway ....................... 56/341 |
| 4,723,401 A | | 2/1988 | Webster et al. |
| 4,723,402 A | | 2/1988 | Webster et al. |
| 4,753,063 A | * | 6/1988 | Buck ............................ 56/377 |
| 4,974,407 A | * | 12/1990 | Rowe et al. ................... 56/377 |
| 4,977,734 A | * | 12/1990 | Rowe et al. ................. 56/15.9 |
| 5,263,306 A | * | 11/1993 | Tonutti ......................... 56/377 |
| 5,899,055 A | | 5/1999 | Rowse et al. |
| 5,966,916 A | * | 10/1999 | Laing ........................... 56/377 |
| 6,463,726 B1 | | 10/2002 | Helfer et al. |
| 6,467,249 B2 | * | 10/2002 | Demanet ...................... 56/377 |

\* cited by examiner

*Primary Examiner*—Árpád Fábián Kovács

(57) ABSTRACT

A device for raising or lowering the individual raking wheels on a foldable hay rake has a rake arm with a plurality of raking wheels, the device comprises a lift tube that is slidably mounted to the rake arm and is hingedly attached to the plurality of raking wheels. The device further comprises a hydraulic cylinder with a fixed end attached to the rake arm and an extendable cylinder rod attached to the forward end of the lift tube. As the cylinder rod operates, it pulls the lift tube from the forward end, thereby raising the raking wheels.

2 Claims, 4 Drawing Sheets

METHOD AND APPARATUS FOR RAISING OR LOWERING THE RAKING WHEELS OF A FOLDABLE HAY RAKE

CROSS REFERENCE TO A RELATED APPLICATION

This application is a continuation in part of Applicant's application Ser. No. 10/640,959 filed Aug. 14, 2003.

BACKGROUND OF THE INVENTION

The present invention relates to a large foldable hay rake that can move through a hay field of cut hay in a swath up to 40 feet wide or greater to turn the hay and present the hay in elongated windrows ready for harvesting or baling, usually in large round or square bales weighing almost a ton or more.

Specifically, the present invention relates to an apparatus for engaging or disengaging the individual raking wheels mounted on a large foldable hay rake. This invention is an improvement over prior and existing large foldable hay rakes such as that shown in U.S. Pat. No. 5,899,055 to Rowse et al.

Existing foldable hay rakes typically have an actuating rod or lift tube that runs alongside and is supported by the rake arms. Individual raking wheels are mounted to the rake arms and are connected to the lift tube such that when the lift tube is translationally shifted relative to the rake arms, the raking wheels are either lifted or lowered. Specifically, existing foldable hay rakes utilize a hydraulic cylinder mounted to the end of the rake arm extension and connected to the lift tube. When the cylinder rod is retracted, the raking wheels are engaged with the ground surface. The cylinder rod extends to effectively push the lift tube from the rearward end of the lift tube and raise the individual raking wheels from the ground surface.

The problem with existing foldable hay rakes is that pushing from the rearward end of the lift tube to raise the individual raking wheels often bends or damages the lift tube.

It is therefore a principal object of this invention to provide a device for raising or lowering the individual raking wheels on a foldable hay rake that is durable and will not damage or bend the other components of the foldable hay rake.

A further object of this invention is to provide a device for raising or lowering the individual raking wheels on a foldable hay rake wherein the lifting cylinder pulls the lift tube from the forward end to raise the raking wheels from the ground surface.

These and other objects will be apparent to those skilled in the art.

BRIEF SUMMARY OF THE INVENTION

The present invention is directed toward a device for raising or lowering the individual raking wheels on a foldable hay rake. On a foldable hay rake having a rake arm with a plurality of raking wheels, the device comprises a lift tube that is slidably mounted to the rake arm and is hingedly attached to the plurality of raking wheels. The device further comprises a hydraulic cylinder with a fixed end attached to the rake arm and an extendable cylinder rod attached to the forward end of the lift tube. As the cylinder rod operates, it pulls the lift tube from the forward end, thereby raising the raking wheels.

DESCRIPTION OF THE PREFERRED EMBODIMENT OF THE INVENTION

Figure 1:
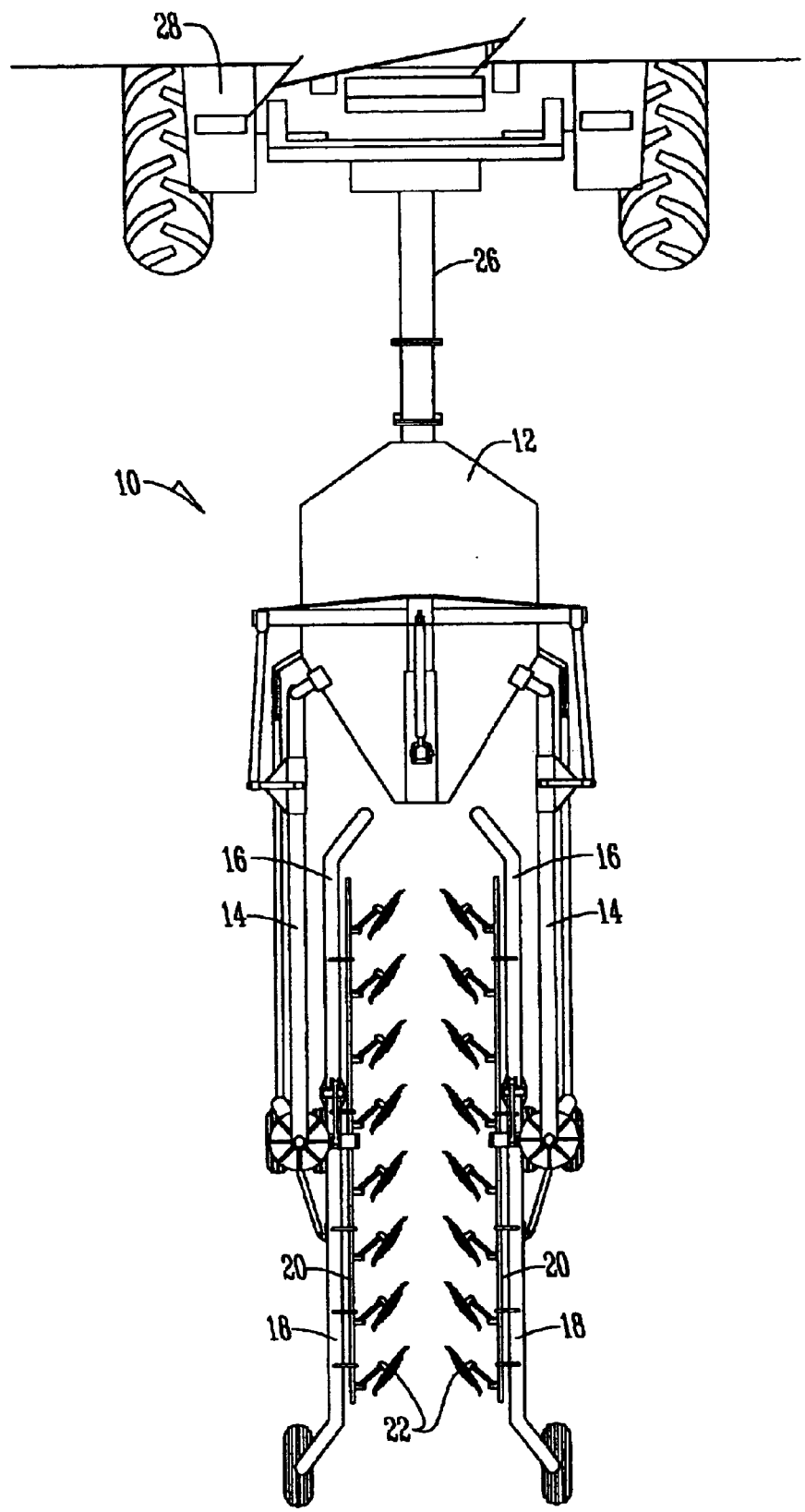
FIG. 1 is a plan view showing the foldable hay rake of this present invention in a travel mode.
Figure 2:
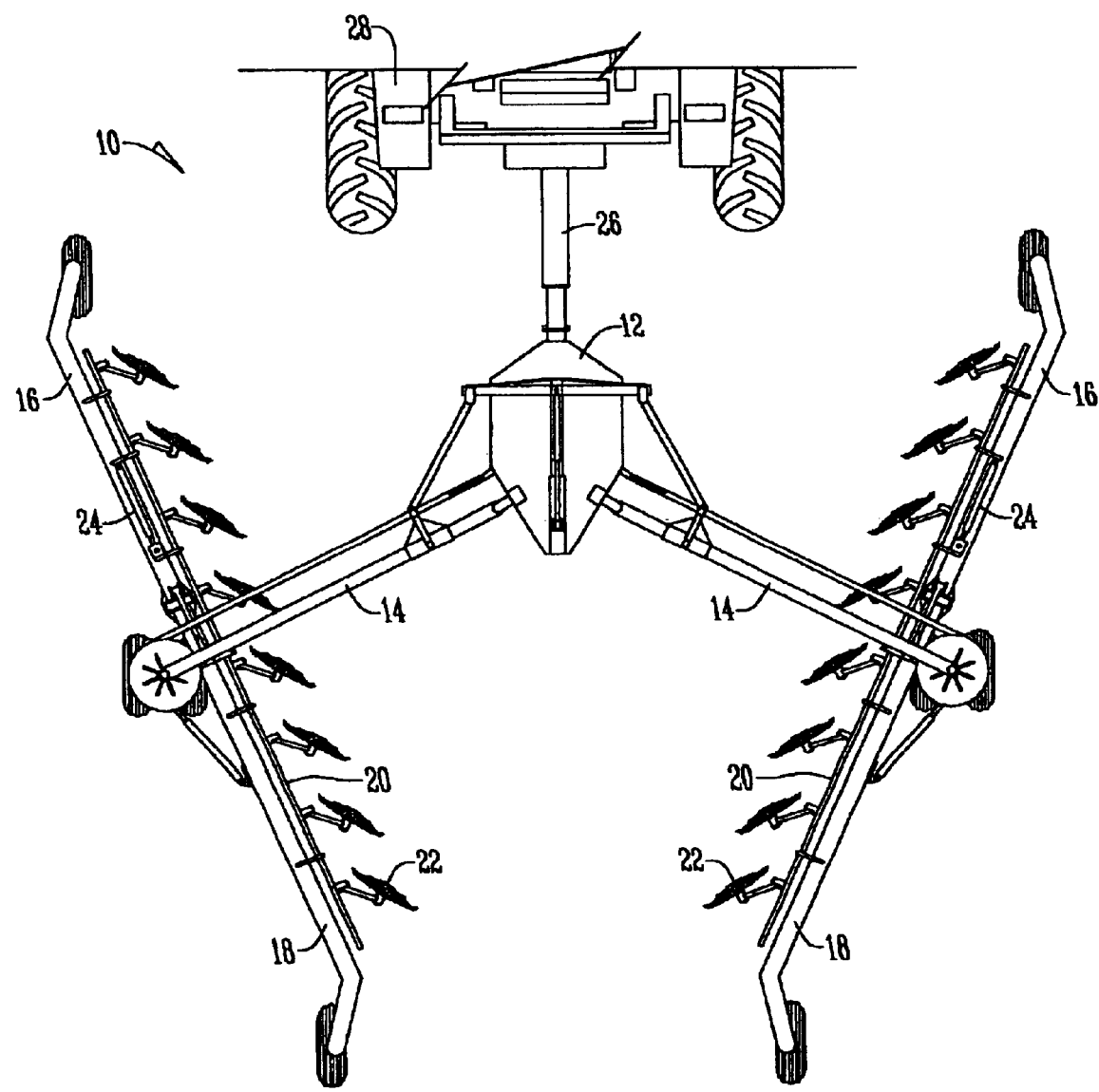
FIG. 2 is view similar to FIG. 1 but shows the foldable hay rake of this present invention in an operational position.

With reference to FIGS. 1–2, a foldable hay rake 10 is shown with a base plate 12, trailing arms 14, forward rake arm portions 16, rearward rake arm portions 18, lift tubes 20, raking wheels 22, and cylinders 24. It is the configuration and operation of cylinder 24 that is the focus of this patent, as will be discussed hereinafter. Hay rake 10 further comprises a tongue 26 that extends forwardly to be connected to the drawbar of a conventional farm tractor 28.

Figure 3:
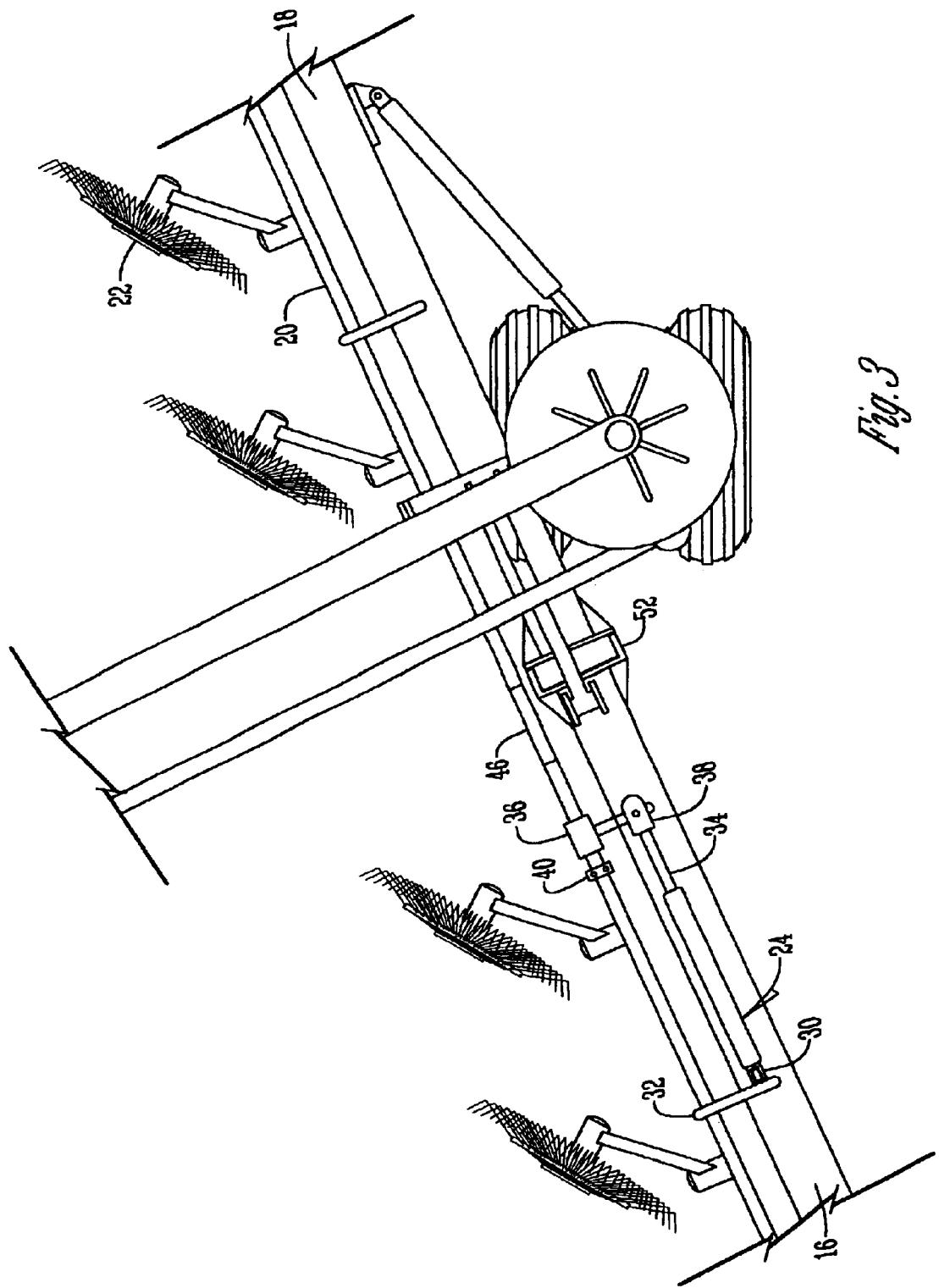
FIG. 3. is a plan view of the lift cylinder of this present invention.

With reference to FIG. 3, the lift tube 20 is slidably mounted to forward rake arm portion 16 such that the lift tube 20 can translationally shift forwardly or rearwardly with respect to the rake arm 16. Raking wheels 22 are hingedly attached to the lift tube 20 such that shifting the lift tube 20 forwardly with respect to the rake arm 16 raises the raking wheels 22 and shifting the lift tube 20 rearwardly lowers the raking wheels 22. Cylinder 24 is used to shift the lift tube 20 forwardly or rearwardly.

Hydraulic cylinder 24 includes a fixed end 30 that is pinned to bracket 32. Bracket 32 is rigidly mounted to rake arm 16 yet does not restrain the translational movement of lift tube 20. Cylinder 24 also includes a cylinder rod 34. Cylinder rod 34 attaches to sleeve 36 via pin 38. Sleeve 36 slides about lift tube 20 and is limited in the forward direction by a collar 40. Collar 40 is rigidly attached to the lift tube 20 by two bolts. As shown in FIG. 3, retracting cylinder rod 34 causes the cylinder 24 to pull the lift tube 20 forwardly. Similarly, extending the cylinder rod 34 allows the lift tube 20 to shift rearwardly. By pulling the lift tube 20 from the forward end, cylinder 24 will not bend the lift tube 20, which commonly occurs in conventional foldable hay rakes that push the lift tube from the rearward end. It should be noted that cylinder 24 may be positioned on the forward rake arm 16 as shown in FIG. 3. Alternatively, cylinder 24 may be flipped end-for-end from that shown in FIG. 3 without altering the performance of the cylinder 24. It is only important that the cylinder 24 be located on the forward rake arm 16 such that the cylinder 24 pulls the lift tube 20 from the forward end of the lift tube to raise the raking wheels 22 regardless of the longitudinal orientation of the cylinder.

Figure 4:
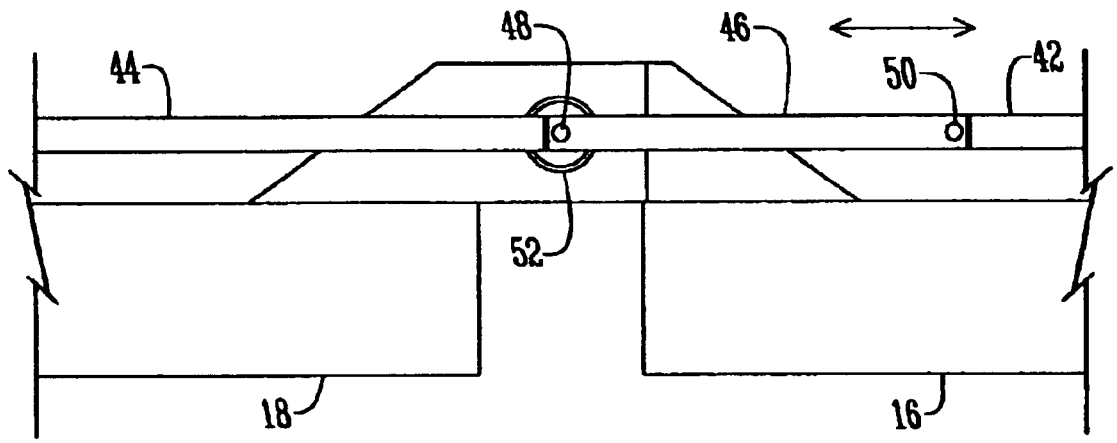
FIG. 4 is a side elevational view of the rake arm pivotal connection showing the lift tube moved to the right.
Figure 5:
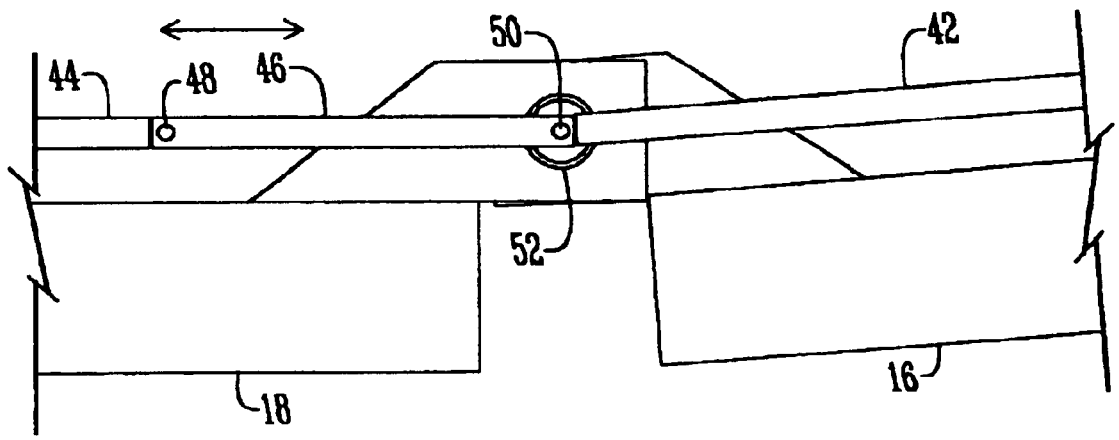
FIG. 5 is a view similar to FIG. 4 but the lift tube is moved to the left across the rake arm pivotal connection.

The lift tube 20 includes a pair of tube portions 42 and 44 interconnected by a hinge tube portion 46, as shown in FIGS. 4 and 5. The opposite pivotal axes 48 and 50 for the hinge tube portion 46 are alternately positioned coaxially with the axis of the rake arm hinge 52 as the lift tube 20 shifts forward or backward for raising or lowering the raking wheels 22. Because of hinge tube portion 46, the lift tube 20 can fold upward along with the forward rake arm 16 about hinge 52 without bending or otherwise damaging the lift tube 20. The cylinder 24 is located forward of hinge 52 and hinge tube portion 46, as shown in FIG. 3, such that cylinder 24 pulls the lift tube 20 in the forward direction.

In operation, hay rake 10 moves from a storage mode, as shown in FIG. 1, to an operational mode, as shown in FIG. 2. Once the hay rake 10 is in the operational mode, the raking wheels 22 can be lowered such that the wheels 22 engage with the ground surface. To lower the raking wheels 22, the cylinder rod 34 is extended from hydraulic cylinder 24, thereby allowing lift tube 20 to translationally shift rearward with respect to rake arm 16. As lift tube 20 shifts rearwardly, the raking wheels 22 will lower towards the ground surface. When the raking wheels 22 are in the lowered position, the wheels 22 are able to cut the hay and otherwise perform the objectives of a hay rake device.

When an operator desires to return the hay rake 10 to the storage mode, the raking wheels 22 must first be raised. To raise the raking wheels 22, cylinder rod 34 is retracted forwardly within cylinder 24. As the cylinder rod 34 retracts, sleeve 36 slides forwardly and engages with the collar 40, thereby pulling the life tube 20 forwardly. As the lift tube 20 moves forwardly, the raking wheels 22 will be raised from the ground surface. Once the raking wheels 22 are raised, the rake arms 16 and 18 of the foldable hay rake 10 may be drawn in such that the hay rake achieves the storage mode position shown in FIG. 1.

It is therefore seen that by the use of a hydraulic cylinder that pulls on the forward end of the lift tube, this invention permits the raising of the individual raking wheels without bending the lift tube or otherwise damaging the foldable hay rake.

What is claimed is:

1. A device for raising or lowering the individual raking wheels on a foldable hay rake having a straight rake arm comprising forward and rearward rake arm portions with a plurality of raking wheels comprising:

a lift tube having forward and rearward ends slidably mounted to the rake arm in parallel fashion and being hingedly attached to the plurality of raking wheels; and a hydraulic cylinder with a fixed end attached to the forward rake arm portion having an extendable cylinder rod attached to the lift tube, and wherein the cylinder is positioned to pull the lift tube and raise the raking wheels.

2. A method for raising or lowering the individual raking wheels on a foldable hay rake having a straight rake arm comprising forward and rearward rake arm portions with a plurality of raking wheels comprising:

providing a lift tube having forward and rearward ends slidably mounted to the rake arm in parallel fashion and being hingedly attached to the plurality of raking wheels; and providing a hydraulic cylinder with a fixed end attached to the forward rake arm portion having an extendable cylinder rod attached to the lift tube in such a manner that actuating the hydraulic cylinder will pull the lift tube and raise the raking wheels.

* * * * *